United States Patent
Schalyo

(10) Patent No.: US 12,503,901 B2
(45) Date of Patent: Dec. 23, 2025

(54) DRIVE ARRANGEMENT FOR MOTORIZED ADJUSTMENT OF A CARGO-SPACE-TAILGATE ARRANGEMENT OF A MOTOR VEHICLE

(71) Applicant: Brose Fahrzeugteile SE & Co. Kommanditgesellschaft, Bamberg, Bamberg (DE)

(72) Inventor: Heino Schalyo, Altendorf (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 805 days.

(21) Appl. No.: 17/585,423

(22) Filed: Jan. 26, 2022

(65) Prior Publication Data

US 2022/0235596 A1     Jul. 28, 2022

(30) Foreign Application Priority Data

Jan. 27, 2021   (DE) ............... 10 2021 101 785.8

(51) Int. Cl.
*E05F 15/611*     (2015.01)

(52) U.S. Cl.
CPC ......... *E05F 15/611* (2015.01); *E05Y 2201/41* (2013.01); *E05Y 2201/422* (2013.01); *E05Y 2400/315* (2013.01); *E05Y 2400/354* (2013.01); *E05Y 2900/546* (2013.01)

(58) Field of Classification Search
CPC ............... E05F 15/611; E05Y 2201/41; E05Y 2201/422; E05Y 2400/315; E05Y 2400/354; E05Y 2900/546
See application file for complete search history.

(56) References Cited

U.S. PATENT DOCUMENTS

| | | | |
|---|---|---|---|
| 6,711,855 B1* | 3/2004 | Daniels | E05F 15/63 49/342 |
| 8,532,873 B1* | 9/2013 | Bambenek | B62D 33/037 340/687 |
| 2007/0048114 A1* | 3/2007 | Wilson | B60P 1/36 414/502 |
| 2018/0266161 A1* | 9/2018 | Jergess | E05F 15/611 |
| 2022/0316259 A1* | 10/2022 | Pulikonda | B62D 33/0273 |

FOREIGN PATENT DOCUMENTS

| | | |
|---|---|---|
| DE | 202018101409 U1 | 4/2018 |
| DE | 102018126838 A1 | 4/2020 |

* cited by examiner

*Primary Examiner* — Adnan M Mirza
(74) *Attorney, Agent, or Firm* — Dickinson Wright PLLC

(57) ABSTRACT

A drive arrangement for motorized adjustment of a cargo-space-tailgate arrangement of a motor vehicle the cargo-space-tailgate arrangement including a cargo-space tailgate adjustable between an open position and a closed position, the drive arrangement includes an electric drive, for providing a drive force, and a control arrangement for activating the electric drive. The drive arrangement includes an output element and a drive coupling. The output element transmits the drive force to the drive coupling for motorized adjustment of the cargo-space tailgate. The control arrangement activates the drive in an adjustment routine for motorized adjustment of the cargo-space tailgate to assist an actuation action introduced manually the cargo-space tailgate, and the control arrangement activates the adjustment routine based on an activation preset that is dependent on at least one friction parameter of the drive.

19 Claims, 2 Drawing Sheets

DRIVE ARRANGEMENT FOR MOTORIZED ADJUSTMENT OF A CARGO-SPACE-TAILGATE ARRANGEMENT OF A MOTOR VEHICLE

CROSS-REFERENCE TO RELATED APPLICATIONS

This application claims priority to German Patent Application No. DE 10 2021 101 785.8, filed on Jan. 27, 2021, the disclosures of which are hereby incorporated in their entirety by reference herein.

TECHNICAL FIELD

The present disclosure relates to a drive arrangement for motorized adjustment of a cargo-space-tailgate arrangement of a motor vehicle.

BACKGROUND

Cargo-space tailgates of motor vehicles, in particular of pickup trucks, are generally equipped nowadays both with a drive arrangement and with many other built-in aids for example, electronic vehicle locking systems, hatches integrated into the cargo-space tailgate, or such like. This increases the weight of the cargo-space tailgate, so great demands are made upon the drive arrangement. In this regard, the focus of attention is on cargo-space tailgates of pickup trucks that are opened and closed under the influence of weight force, in which connection, in particular, electric drives having large dimensions are required for the purpose of providing appropriately large drive forces.

One challenge in this regard is that the drive arrangement has a noticeable influence on the motion behavior of the cargo-space tailgate in the course of a manual actuation action by the operator. The manual actuation action may be a manual adjustment of the hatch or a triggering of a motorized adjustment via a manual movement of the cargo-space tailgate. The influence of the drive arrangement may have the result that either the cargo-space tailgate is perceived to be particularly sluggish in the course of a manual adjustment, or in the case of excessive motorized assistance a sequence of motions takes place that is perceived by the operator to be unnatural.

SUMMARY

One or more problems underlying the embodiments described herein may be to provide a drive arrangement and to develop it further in such a manner that the ease of operation of the drive arrangement is enhanced.

The drive arrangement may be equipped with an electric drive, for providing a drive force, and with a control arrangement for activating the electric drive.

In addition to the weight force of the cargo-space tailgate and any friction effects in the hatch kinematics, a significant contribution to the motion behavior of the cargo-space tailgate is generated by the drive friction, this contribution becoming clear, in particular, in the case of the cargo-space tailgates being considered.

In detail, it is proposed that the control arrangement activates the drive in an adjustment routine for motorized adjustment of the cargo-space tailgate, and that the control arrangement undertakes the activation in the adjustment routine in a manner depending on an activation preset that is dependent on at least one friction parameter of the drive.

As an example, the control arrangement activates the drive in the adjustment routine for the purpose of assisting an actuation action introduced manually into the hatch kinematics via the cargo-space tailgate. Hence the cargo-space tailgate undergoes a combined hatch motion, brought about jointly in motorized manner and manually, for the purpose of reducing the manual forces to be applied by the operator. In the combined hatch motion the cargo-space tailgate is consequently moved in an actuation direction both by reason of a manual actuation action by the operator and by reason of a motorized adjustment by means of the drive arrangement.

With the aid of the friction parameter representing the drive friction, the motorized assistance can be adapted to the respective mechanical boundary conditions, so that a hatch motion is obtained that is perceived to be particularly natural. As an example, the drive friction may be at least partially compensated for via the consideration of the friction parameter, so that, for instance, the weight force of the cargo-space tailgate becomes noticeable for the operator in a natural way with the actuation action. With the aid of the friction parameter, a measurement of force at the cargo-space-tailgate arrangement can also be dispensed with, since the drive friction is taken into consideration with the aid of control-engineering means.

In one or more embodiments, a clearance between the output element and the drive coupling of the drive arrangement is made use of for the purpose of determining the friction parameter. The insight underlying this configuration is that, in the case of a coupling subject to a clearance, the influence of the drive friction in the course of operating the drive within the clearance can be ascertained largely independently of further interactions such as the weight force of the hatch. Consequently, a calibration routine with an adjustment of the drive in the mechanical clearance is provided, enabling the determination of the friction parameter with high accuracy and also during ongoing operation of the motor vehicle, without having to make use of additional force sensors.

As one example, a friction-drive value, such as a friction-drive current, in the mechanical clearance. At a constant drive speed, in this connection a friction-drive constant can be determined as friction parameter for instance, a friction-drive current that is necessary for overcoming an approximately constant friction torque counteracting a rotational drive motion.

As an example, in addition the mechanical clearance is utilized with the calibration routine to the effect that drive parameters of a drive characteristic of the drive can be ascertained largely independently of further influences. The drive parameter is determined, in particular, in an acceleration phase, for instance in the start-up phase of the drive.

One or more embodiments relate to a compensation drive value in the activation preset that is dependent, in particular, on at least one friction parameter. By this means, the drive friction can be at least partially compensated for in straightforward manner with the activation of the drive.

In one or more embodiments, the compensation drive value, the friction-drive value, and/or drive parameter may be ascertained, for example, in the calibration routine is/are made use of.

In one or more embodiments, the activation preset has been defined in such a manner that the compensation drive value compensates for the drive friction within a predetermined deviation or even completely, so that, in particular, the motorized assistance of a manual hatch movement is perceived to be approximately frictionless.

In another embodiment, the implementation of the calibration routine may occur when the tailgate is in the open position and/or in the closed position, so that the range of adjustment of the drive corresponding to the mechanical clearance can be detected in straightforward manner from drive values, for instance from the drive current.

As an example, the implementation of the calibration routine is taken into consideration also during ongoing operation of the motor vehicle, so that any temporal change in the drive friction is also captured.

According to another embodiment, the cargo-space-tailgate arrangement may be provided in motor vehicle, and a drive arrangement according to the proposal is provided. Reference may be made to all the remarks relating to the drive arrangement according to the proposal.

According to yet another embodiment, a method for operating a drive arrangement for motorized adjustment of an adjusting element of a motor vehicle is provided. The drive arrangement may be equipped with an electric drive, for providing a drive force, and with a control arrangement for activating the electric drive, and is configured, as an example, as a drive arrangement according to the proposal.

In this connection, the drive arrangement may be activated by the control arrangement in an adjustment routine for motorized adjustment of the adjusting element, that by means of the control arrangement the activation in the adjustment routine is undertaken in a manner depending on an activation preset that is dependent on at least one friction parameter of the drive, that the output element and the drive coupling are coupled subject to a mechanical clearance in which the output element is capable of being operated by the drive without transmission of the drive force to the drive coupling, and that by means of the control arrangement the at least one friction parameter and/or at least one drive parameter of a drive characteristic of the drive is/are determined in a calibration routine at least partially with an adjustment of the drive in the mechanical clearance.

With respect to the advantages and configurations of the calibration routine utilizing the mechanical clearance, reference may be made to the relevant remarks relating to the drive arrangement according to the proposal. By "an adjusting element" here, exterior or interior elements are also understood for instance, seat-adjusters, fan arrangements, paneling elements, lighting means, side mirrors and such like. In principle, via the drive arrangement the adjusting element can undergo a translation, for instance an approximately linear adjustment path, and/or a rotation, for instance a swiveling motion.

However, the adjusting element may be configured as a hatch of a hatch arrangement of the motor vehicle. The hatch may be the cargo-space tailgate already considered in connection with the drive arrangement according to the proposal. Other types of hatch are, for instance, hoods, doors, in particular side doors or rear doors, or such like.

BRIEF DESCRIPTION OF THE DRAWINGS

In the following, the invention will be elucidated in more detail with reference to a drawing merely representing embodiments. In the drawing.

DETAILED DESCRIPTION

Figure 1:
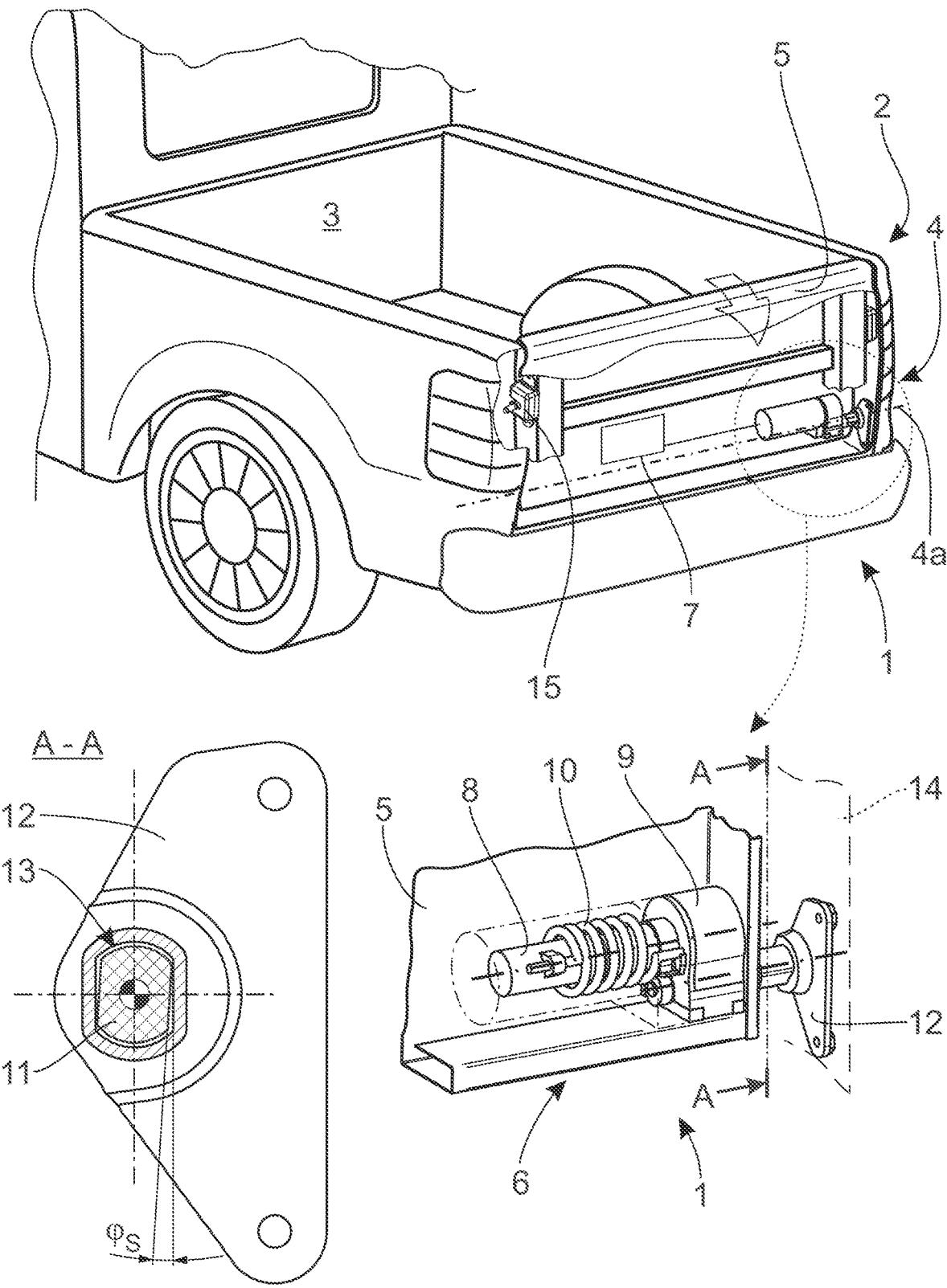
FIG. 1 shows the rear region of a motor vehicle with a cargo-space-tailgate arrangement according to the proposal, which is equipped with a drive arrangement according to the proposal, as well as detailed views of the drive arrangement according to the proposal.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The drive arrangement 1 represented in the drawing is configured for motorized adjustment of a cargo-space-tailgate arrangement 2 of a motor vehicle 3. The cargo-space-tailgate arrangement 2 exhibits a cargo-space tailgate 5 which with the aid of hatch kinematics 4 is adjustable between an open position, not shown, and the closed position represented in FIG. 1.

By the term "hatch kinematics", all the components are summarized that permit the motion of the cargo-space tailgate 5. The hatch kinematics 4 are configured here in such a manner that the cargo-space tailgate 5 is capable of being swiveled about a geometric hatch axis 4a, in which connection other configurations of the hatch kinematics 4 are conceivable.

The motor vehicle 3 here, as an example, is a pickup truck, the cargo-space tailgate 5 being arranged in such a manner that an opening motion indicated by the arrow in FIG. 1 is assisted by the weight force of the cargo-space tailgate 5. A closing motion requires a hatch motion at least partially contrary to the weight force, the drive arrangement 1 being provided for the purpose of assisting the operator in moving the cargo-space tailgate 5.

The drive arrangement 1 is equipped with an electric drive 6, for providing a drive force, and with a control arrangement 7 for activating the electric drive 6. The drive 6 exhibits an electric drive motor 8 here, and as an example, a rotary drive motor 8 and also a transmission 9. In addition, a spring element 10 is provided for making a mechanical preload available. The transmission 9 translates the rotational drive motion generated by the drive motor 8 into a rotational motion of an output element 11.

As represented, the control arrangement 7 may have been configured as a hatch-control unit assigned to the cargo-space-tailgate arrangement 2, which interacts with a higher-level motor-vehicle control system. Instead of this decentralized approach, the control arrangement 7 may also be an integral part of a central motor-vehicle control system. The control arrangement 7 may include control electronics for realizing the control tasks arising here.

The drive arrangement 1 exhibits the output element 11 and a drive coupling 12, which can be discerned in more detail in the sectional representation A-A from FIG. 1. In the assembled state, the output element 11 transmits the drive force generated by the drive 6 to the drive coupling 12 for motorized adjustment of the cargo-space tailgate 5. Here, as an example, the output element 11 is configured as a drive pin which engages in a recess 13 on the drive coupling 12 for the purpose of transmitting a drive torque brought about by the drive force.

The drive coupling 12 is further configured as a body attachment which, in the assembled state, is attached in torsion-resistant manner to the body 14 of the motor vehicle 3, whereas the drive 6 is assigned to the cargo-space tailgate 5. An inverse arrangement is conceivable, with which the drive 6 is assigned to the body 14.

The drive force may be the force exerted on the output element 11 by the drive 6 via the drive motor 8 and the transmission 9, which here realizes a drive torque.

As an example, the control arrangement 7 activates the drive 6 in an adjustment routine for motorized adjustment of the cargo-space tailgate 5, in particular for the purpose of assisting an actuation action introduced manually into the hatch kinematics 4 via the cargo-space tailgate 5, and that the control arrangement 7 undertakes the activation in the adjustment routine in a manner depending on an activation preset that is dependent on at least one friction parameter of the drive 6.

Various values of the friction parameter may consequently result in a variable activation of the drive 6 by the control arrangement 7. Generally, the friction parameter is representative of the impact of a friction effect in the drive 6 on the motion of the output element 11. The friction parameter may be representative of the friction of one of the drive components of the drive 6. By the "drive components", those components of the drive arrangement 1 are understood which have been set up for a direct or indirect generation and/or transmission of the drive motion to the output element 11, in which connection, among other things, the drive motor 8 and the transmission 9 exhibit such drive components. In particular, the friction parameter is indicative of the force and/or the torque that has/have to be expended in order to move the output element 11 contrary to the drive friction when the drive 6 is de-energized.

In a particularly preferred configuration, the output element 11 and the drive coupling 12 are coupled subject to a mechanical clearance. In the sectional representation A-A from FIG. 1, the inner contour of the recess 13 for the output element 11 is configured to be slightly larger than the outer contour of the output element 11 engaging therein. Here, the output element 11 can be rotated over a rotation-angle range cps without a torque being transmitted from the output element 11 to the drive coupling 12. Other backgrounds for the mechanical clearance are conceivable, the output element 11 finally being capable of being operated in the clearance without transmission of the drive force to the drive coupling 12 by the drive 6.

The control arrangement 7 here determines the at least one friction parameter in a calibration routine at least partially with an adjustment of the drive 6 in the mechanical clearance. The basis for this is the insight that with an operation of the drive 6 in the clearance the drive friction can be considered largely isolated from other influences.

Figure 2:
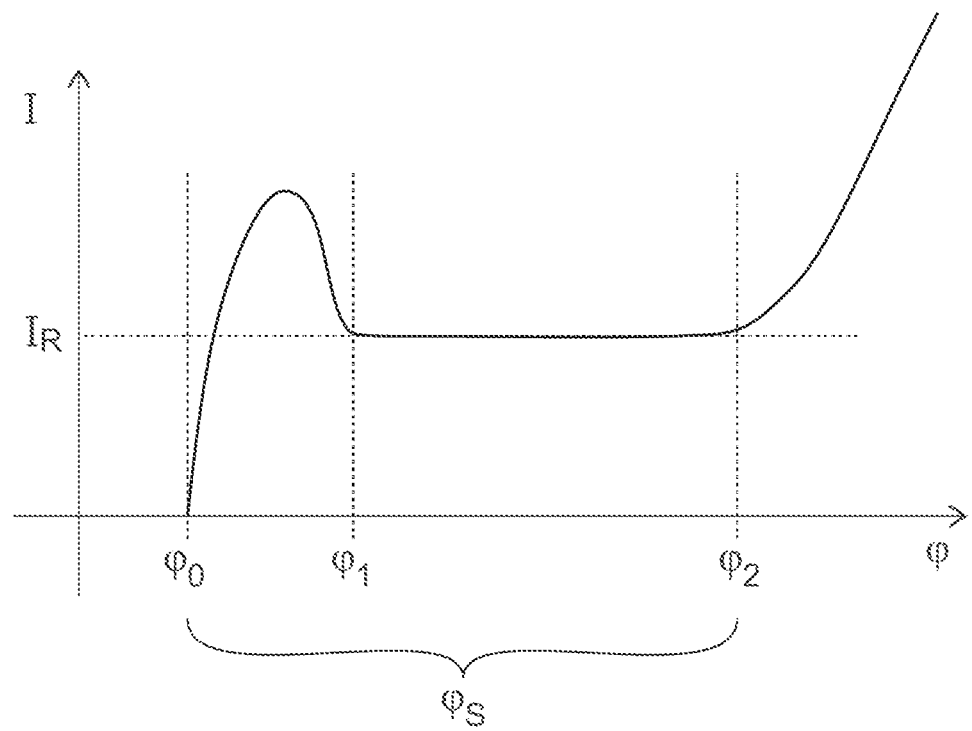
FIG. 2 shows a schematic representation of a drive value in the calibration routine.

FIG. 2 shows a schematic representation of a drive value in the calibration routine, the drive current I being represented here, by way of example, as a function of the rotation angle φ. In the calibration routine, by way of example the angular velocity ω can be kept constant within time-intervals. The drive motion proceeds from a starting angle $\varphi_0$ of the output element 11, whereby after a start-up phase between angles $\varphi_0$ and $\varphi_1$ with a varying progression of the drive current I a constant angular velocity ω is obtained between angles $\varphi_1$ and $\varphi_2$. Correspondingly, an approximately constant drive current I is observed in the range between angles $\varphi_1$ and $\varphi_2$. With angle $\varphi_2$, the end of the clearance and hence the beginning of a transmission of a drive force to the drive coupling 12 is reached, so that the drive current I increases with the further drive motion.

The control arrangement 7 here can determine the at least one friction parameter on the basis of a drive value, in particular on the basis of the drive current I, in the mechanical clearance.

In the calibration routine the control arrangement 7 may determine a friction-drive value, such as a friction-drive current $I_R$, in the mechanical clearance, the friction-drive value being predetermined as at least one friction parameter. The friction-drive value may be an instantaneous value of the drive value which is to be regarded as characteristic of the drive friction on the basis of the progression of the drive value in the mechanical clearance. Here, as an example, in the calibration routine the control arrangement determines a friction-drive constant as friction-drive value. Here, the friction-drive current $I_R$ in the mechanical clearance is ascertained at a constant angular velocity ω in the range between angles $\varphi_1$ and $\varphi_2$ already considered. At constant angular velocity ω it may be assumed that an approximately constant friction torque $M_R$—which, in turn, is approximately proportional to the friction-drive current $I_R$—opposes the drive motion:

$$M_R = I_R \cdot k_2.$$

In another configuration, in the calibration routine the control arrangement 7 determines in the mechanical clearance at least one drive parameter of a drive characteristic of the drive, such as the ratio $k_2$ of drive torque M to drive current I. The activation preset may be dependent on the drive parameter. In this connection, the drive characteristic can be determined, as an example, from the phases of the drive motion in the clearance, in which a variable drive speed obtains.

As an example, in this connection it is the case that in the calibration routine the control arrangement 7 determines the drive parameter in the mechanical clearance in a start-up phase of the drive 6. In the present case, the drive parameter $k_2$ can be ascertained with the aid of the temporal progression of the drive current I(t) in the range between angles $\varphi_0$ and $\varphi_1$:

$$k_2 = d\omega/dt \cdot J/(I(t) - I_R)$$

where dω/dt is the temporal change in angular velocity ω and J is the moment of inertia acting on the drive motion. The moment of inertia J may have been predetermined, for instance with the aid of a calculation on the basis of the geometry and/or on the basis of a reference measurement.

In one or more embodiments, the activation preset may include a compensation drive value, a compensation drive current $I_{Komp}$ which, in particular, is dependent on at least one friction parameter. The compensation drive value serves here for an at least partial annulment of the drive friction in the motorized adjustment. The effect of the drive friction that is noticeable by the operator in the hatch motion is consequently at least reduced with the aid of the compensation drive value.

The compensation drive value may include a component that is dependent on the friction-drive value, preferentially a component that is proportional to the friction-drive constant. For the friction-drive current $I_R$ already considered, a compensation drive current $$I_{Komp} = I_R \omega / |\omega|$$

may, for instance, be predetermined, the expression ω/|ω| taking the directionality of the drive friction into consideration.

Likewise, the compensation drive value may have a component that is dependent on the drive parameter, preferentially an acceleration term that is dependent on the drive parameter. For the drive parameter $k_2$ already considered, a compensation drive current $$I_{Komp} = d\omega/dt \cdot J/k_2$$

may, for instance, have been predetermined, by which, in particular, inertial effects of the drive 6 are at least partially compensated for. In a further configuration, the aforementioned components of $I_{Komp}$ can be gathered together:

$$2I_{Komp} = I_R \omega/|\omega| + d\omega/dt \cdot J/k_2.$$

The activation preset may be defined in such a manner that the compensation drive value compensates for the drive friction, within a predetermined deviation. In this connection, the deviation may represent a predetermined accuracy window for the compensation, or may also be representative of the fact that a predetermined part of the drive friction is not compensated for. However, the drive friction is compensated for completely with the compensation drive value, so that, in particular, the cargo-space tailgate 5 can be moved by the operator, or a hatch motion brought about in motorized manner can be brought about without the drive friction becoming noticeable.

According to another embodiment, the control arrangement 7 implements the calibration routine in the open position and/or in the closed position of the cargo-space tailgate 5. Consequently, the drive motion that has been considered can be brought about in the mechanical clearance in a well-defined position of the cargo-space tailgate 5.

The control arrangement 7 may activate the drive 6 in the calibration routine in a direction of an end-stop of the cargo-space-tailgate arrangement 2. Hence the reaching of the end of the clearance is capable of being detected in straightforward manner on the basis of the drive values. Accordingly, in FIG. 2 the progression of the drive current I at angles $\varphi$ greater than $\varphi_2$ corresponds to an approximation to a blocking current of the drive 6, since the drive motion is blocked via the end-stop. Likewise, a motor-vehicle lock 15 may have been provided for the purpose of arresting the cargo-space tailgate 5 in the closed position. If the drive 6 is activated in the direction of the open position when a cargo-space tailgate 5 has been locked via the motor-vehicle lock 15, this likewise results in an approximation to a blocking current of the drive 6 after the clearance has been traversed.

With the calibration routine the clearance can also be traversed several times. For instance, when the end of the clearance is reached, the drive direction is reversed, in particular repetitively. With a multiple traversing of the clearance, it is conceivable that the accuracy of the calibration routine is improved and/or a directionality of the parameters ascertained in the calibration routine is determined.

In the course of the realization, according to the proposal, of the calibration routine, it is interesting that the friction parameter can be ascertained, even repeatedly, by control-engineering means during ongoing operation of the motor vehicle 3. Temporal influences on the drive friction for instance, by reason of wear, contamination, or influences of weather such as ambient temperature or atmospheric humidity can consequently be captured via the calibration routine and taken into consideration in the adjustment routine.

In a preferred configuration, the control arrangement 7 triggers the calibration routine upon detecting a predetermined operator action, such as upon capturing an approach of the operator, upon an authentication check of the operator, upon an unlocking of the cargo-space tailgate 5 and/or upon capturing an actuation action introduced manually into the hatch kinematics 4 via the cargo-space tailgate 5.

An approach of an operator is captured, for instance, via a proximity-sensor arrangement which is also provided for an authentication check for keyless access to the motor vehicle 3. Likewise, the calibration routine may also be undertaken only in response to a successful authentication check. The actuation action introduced manually into the hatch kinematics 4 via the cargo-space tailgate 5 is, for instance, a predefined actuation action for triggering a motorized adjustment—for instance, a prodding of the cargo-space tailgate 5 by the operator—which is captured on the basis of the drive values and/or on the basis of motion sensors.

Likewise, the control arrangement 7 can trigger the calibration routine in time-controlled manner, for instance at predetermined time-intervals, by which, in particular, a regular updating of the friction parameter is guaranteed.

According to a further teaching, to which independent significance is attached, a cargo-space-tailgate arrangement 2 of a motor vehicle 3, preferably a pickup truck, is claimed as such. The cargo-space-tailgate arrangement 2 exhibits a cargo-space tailgate 5 which with the aid of hatch kinematics 4 is adjustable between an open position and a closed position, in which connection a drive arrangement 1 with an electric drive 6, for making a drive force available, and with a control arrangement 7, for activating the electric drive 6, is provided. The drive arrangement 1 exhibits an output element 11 and a drive coupling 12, the output element 11 transmitting the drive force to the drive coupling 12 for motorized adjustment of the cargo-space tailgate 5. The drive arrangement 1 is configured as a drive arrangement 1 according to the proposal, so reference is made to all the remarks relating to the drive arrangement 1 according to the proposal.

According to a further teaching, to which independent significance is likewise attached, a method for operating a drive arrangement 1 for motorized adjustment of an adjusting element of a motor vehicle 3 is claimed as such. In particular, the method serves for operating a drive arrangement 1 according to the proposal. The drive arrangement 1 is equipped with an electric drive 6, for providing a drive force, and with a control arrangement 7 for activating the electric drive 6. The drive arrangement 1 exhibits an output element 11 and a drive coupling 12, the drive force being transmitted by means of the output element 11 to the drive coupling 12 for motorized adjustment of the adjusting element.

In this connection, it is essential that by means of the control arrangement 7 the drive 6 is activated in an adjustment routine for motorized adjustment of the adjusting element, that by means of the control arrangement 7 the activation in the adjustment routine is undertaken in a manner depending on an activation preset that is dependent on at least one friction parameter of the drive. The output element 11 and the drive coupling 12 are coupled subject to a mechanical clearance in which the output element 11 is capable of being operated by the drive 6 without transmission of the drive force to the drive coupling 12. By means of the control arrangement 7, the at least one friction parameter and/or at least one drive parameter of a drive characteristic of the drive 6 is/are determined in a calibration routine at least partially with an adjustment of the drive 6 in the mechanical clearance.

The method according to the proposal consequently makes use of the calibration routine already considered, utilizing a mechanical clearance. To this extent, reference may be made to the above remarks relating to the calibration routine. In addition to the motorized adjustment of cargo-space tailgates, the method may also relate to the motorized adjustment of further adjusting elements, for instance seat-adjusters, fan arrangements, paneling elements, lighting means, side mirrors or such like.

According to one or more embodiments, however, the adjusting element is configured as a hatch of a hatch arrangement of the motor vehicle 3, such as a cargo-space tailgate 5, or a cargo-space tailgate 5 of a pickup truck, the hatch being adjustable between an open position and a closed position with the aid of hatch kinematics 4.

As already considered, the drive 6 may be activated in the adjustment routine by means of the control arrangement 7 for the purpose of assisting an activation action introduced manually into the hatch kinematics 4 via the hatch. In this connection, a hatch motion takes place that is brought about manually and in motorized manner jointly, the drive friction, such as, being at least partially compensated for when the drive 6 is activated.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

1 drive arrangement
2 tailgate arrangement
3 motor vehicle
4 hatch kinematics
5 cargo-space tailgate
5 tailgate
6 electric drive
7 control arrangement
8 electric drive motor
9 transmission
10 spring element
11 output element
12 drive coupling
13 recess
14 body
15 motor-vehicle lock
4a geometric hatch axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A drive arrangement configured to provide motorized adjustment of a tailgate configured to move between an open position and a closed position and disposed in a cargo-space-tailgate arrangement of a motor vehicle, the drive arrangement comprising:
    an electric drive configured to generate a drive force;
    a control arrangement configured to activate the electric drive
    an output element; and
    a drive coupling, wherein the output element is configured to transmit the drive force to the drive coupling for the motorized adjustment of the tailgate,
    wherein the control arrangement is configured to perform an adjustment routine, in which the electric drive is activated to provide the motorized adjustment of the tailgate based on an activation preset, wherein the activation preset is based on at least one friction parameter of the electric drive; and
    wherein the output element and the drive coupling are coupled to one another to form a mechanical clearance, in which the output element is permitted to be operated by the electric drive without transmitting the drive force to the drive coupling, and wherein the control arrangement is configured to perform a calibration routine, in which the electric drive is at least partially adjusted in the mechanical clearance to determine the at least one friction parameter.

2. The drive arrangement of claim 1, wherein during the calibration routine, the control arrangement is configured to determine a friction-drive value in the mechanical clearance, and wherein the at least one friction parameter is based on the friction-drive value.

3. The drive arrangement of claim 1, wherein during the calibration routine, the control arrangement is configured to determine at least one drive parameter of a drive characteristic of the electric drive.

4. The drive arrangement of claim 1, wherein the activation preset includes a compensation drive value.

5. The drive arrangement of claim 4, wherein the output element and the drive coupling are coupled to one another to from a mechanical clearance, and the compensation drive value includes a component based on a friction-drive value in the mechanical clearance.

6. The drive arrangement of claim 4, wherein the activation preset is defined so that the compensation drive value at least partially compensates for the drive friction.

7. The drive arrangement of claim 1, wherein the control arrangement is configured to perform the calibration routine in response to the tailgate being in the open position and/or in the closed position.

8. The drive arrangement of claim 1, wherein the control arrangement is configured to perform the calibration routine in response to detecting a predetermined operator action, and/or after a predetermined period of time.

9. A cargo-space-tailgate arrangement for use in a motor vehicle, the cargo-space-tailgate arrangement including a tailgate configured to be adjusted between an open position and a closed position, the cargo-space-tailgate arrangement comprising:
    a drive arrangement provided with an electric drive configured to generate a drive force; and
    a control arrangement configured to actuate the electric drive wherein the drive arrangement includes an output element and a drive coupling, wherein the output element is configured to transmit the drive force to the drive coupling for motorized adjustment of the cargo-space tailgate wherein the control arrangement is configured to determine a friction-drive value based on a friction between the output element and the drive coupling;
    wherein the output element and the drive coupling are coupled to one another to form a mechanical clearance, in which the output element is permitted to be operated by an electric drive without transmitting the drive force to the drive coupling, and wherein the control arrangement is configured to perform a calibration routine, in which the electric drive is at least partially adjusted in the mechanical clearance to determine the at least one friction parameter.

10. A method for operating a drive arrangement to provide motorized adjustment of an adjusting element of a motor vehicle, the method comprising:
  activating a calibration routine, by a control arrangement, including actuating an electric drive of the drive arrangement to at least partially adjust the electric drive in a mechanical clearance defined by a drive coupling without transmitting a drive force from the electric drive to the drive coupling, wherein the drive arrangement includes an output element and a drive coupling, wherein the output element is configured to transmit the drive force to the drive coupling for motorized adjustment of the adjusting element, wherein the calibration routine is configured determine at least one friction parameter of a drive characteristic of the electric drive; and
  activating an adjustment routine, by the control arrangement, based on an activation preset based on at least one friction parameter of the electric drive.

11. The method of claim 10, wherein the adjusting element is a hatch of a hatch arrangement of the motor vehicle, and the hatch is adjustable between an open position and a closed position.

12. The method of claim 11, further comprising:
  detecting a manual actuation action of the hatch, wherein the activating an adjustment routine step is triggered in response to the detecting step.

13. The drive arrangement of claim 1, wherein the control arrangement is configured to perform the adjustment routine in response to a manual actuation action applied to the tailgate.

14. The drive arrangement of claim 1, wherein the control arrangement is configured to determine the at least one friction parameter based on a drive current of the electric drive.

15. The drive arrangement of claim 2, wherein the control arrangement is configured to determine a friction-drive constant as the output element moves in the mechanical clearance at a constant drive speed and the at least one friction parameter is based on the friction-drive constant.

16. The drive arrangement of claim 3, wherein the at least one drive parameter is a ratio of drive torque to a drive current of the electric drive, and the activation preset is based on the at least one drive parameter.

17. The drive arrangement of claim 4, wherein the compensation drive value is a compensation drive current based on the at least one friction parameter.

18. The drive arrangement of claim 4, wherein the control arrangement is configured to determine a friction-drive constant as the output element moves in the mechanical clearance at a constant drive speed, and the compensation drive value includes a component proportional to the friction-drive constant.

19. The drive arrangement of claim 7, wherein during the calibration routine, the control arrangement is configured to activate the electric drive to move the tailgate towards an end-stop of the cargo-space-tailgate arrangement and/or to move the tailgate towards the open position when the tailgate is locked via a motor-vehicle lock.

* * * * *